United States Patent [19]
Kataoka et al.

[11] Patent Number: 6,016,178
[45] Date of Patent: Jan. 18, 2000

[54] REFLECTIVE GUEST-HOST LIQUID-CRYSTAL DISPLAY DEVICE

[75] Inventors: Hideo Kataoka; Nobuyuki Shigeno; Masaki Munakata; Tetsuo Urabe, all of Kanagawa, Japan

[73] Assignee: Sony Corporation, Tokyo, Japan

[21] Appl. No.: 08/818,182

[22] Filed: Mar. 14, 1997

[30] Foreign Application Priority Data

Sep. 13, 1996 [JP] Japan .................................. 8-265577

[51] Int. Cl.⁷ .......................... G02F 1/1335; C09K 19/60
[52] U.S. Cl. ........................ 349/117; 349/113; 349/106; 349/165
[58] Field of Search .................... 349/117, 113, 349/106, 165

[56] References Cited

U.S. PATENT DOCUMENTS

| | | | |
|---|---|---|---|
| 3,612,654 | 10/1971 | Klien .......................................... | 349/113 |
| 4,097,131 | 6/1978 | Nishiyama .............................. | 349/113 |
| 4,213,676 | 7/1980 | Kaufmann ............................... | 349/113 |
| 4,272,162 | 6/1981 | Togashi et al. .......................... | 349/117 |
| 4,519,678 | 5/1985 | Komatsubara et al. ................ | 350/338 |
| 5,499,126 | 3/1996 | Abileah et al. ........................... | 359/68 |
| 5,671,031 | 9/1997 | Nakamura et al. ...................... | 349/106 |
| 5,699,135 | 12/1997 | Hisatake et al. ......................... | 349/106 |

FOREIGN PATENT DOCUMENTS

6-222351  8/1994  Japan .................................... 349/113

*Primary Examiner*—William L. Sikes
*Assistant Examiner*—Tirifur R. Chowdhury
*Attorney, Agent, or Firm*—Hill & Simpson

[57] ABSTRACT

A color reflective guest-host liquid-crystal display device is provided which does not require a polarizing plate and which has a bright screen. A transparent electrode is formed on an upper substrate of a color reflective guest-host liquid-crystal display device. A reflection electrode is formed on a lower substrate, and an electro-optic element is held in the spacing between the two substrates so as to perform light modulation in response to an applied voltage. The electro-optic element has a laminated structure including a guest-host liquid-crystal layer which contains a dichroic dye and which is uniformly oriented along the transparent electrode, and a phase shifter which has a predetermined optical anisotropic axis and which is formed along the reflection electrode. The transparent electrode and the reflection electrode face each other and define a plurality of pixels. A color filter assigns incident light of a different wavelength to each pixel. The phase shifter is divided for each pixel, and the thickness thereof is adjusted according to a corresponding wavelength. Further, when this liquid-crystal display device is formed into an active matrix type, the pixel aperture ratio can be improved by providing the color filter on the drive substrate side on which switching elements and pixel electrodes are formed rather than on the facing substrate.

9 Claims, 7 Drawing Sheets

REFLECTIVE GUEST-HOST LIQUID-CRYSTAL DISPLAY DEVICE

BACKGROUND OF THE INVENTION

1. Field of the Invention

The present invention relates to a reflective guest-host liquid-crystal display device. More particularly, the present invention relates to technology for improving use efficiency of incident light by incorporating therein a phase shifter and removing a polarizing plate. Still more particularly, the present invention relates to technology for improving display quality by removing wavelength dependence characteristic of a built-in phase shifter in a case in which a color display is made, and also to a structure of a micro-color filter required for color display and a method of manufacturing the same.

2. Description of the Related Art

There are various modes in a liquid-crystal display device. At present, TN or STN modes employing a twist-oriented or supertwist-oriented nematic liquid crystal are most common. However, in respect of operating principles, these modes require a pair of polarizing plates. Since light is absorbed by the polarizing plates, transmittance is low, and a bright display screen cannot be obtained. In addition to these modes, a guest-host mode using a dichroic dye has also been developed. A guest-host mode liquid-crystal display device produces a display by using an anisotropic property of the absorption coefficient of a dichroic dye added to a liquid crystal. If a dichroic dye having a bar-shaped structure is used, since dye molecules have a property to orientate parallel to the liquid-crystal molecules, the orientation direction of the dye also varies if the molecular orientation of the liquid crystal is varied by applying an electric field thereto. Since this dye is made colored or not depending upon the orientation direction, it is possible to switch between a colored state and a colorless state of the liquid-crystal display device by applying a voltage.

FIGS. 6A and 6B show the structure of a Heilmeier-type guest-host liquid-crystal display device; FIG. 6A shows a state in which a voltage is not applied, and FIG. 6B shows a state in which a voltage is applied. This liquid-crystal display device uses a p-type dye and a nematic liquid crystal ($N_p$ liquid crystal) with positive dielectric anisotropy. A p-type dichroic dye has an absorption axis which is nearly parallel to the molecular axis; therefore, it strongly absorbs polarization components Lx parallel to the molecular axis and hardly absorbs polarization component Ly vertical thereto. In the state, shown in FIG. 6A, where no voltage is applied, the polarization components Lx contained in the incident light are strongly absorbed by the p-type dye, and the liquid-crystal display device is made colored. For example, if a black dichroic dye is used, the liquid-crystal display device is colored black. In comparison with this, in the state, shown in FIG. 6B, where a voltage is applied, the $N_p$ liquid crystal having positive dielectric anisotropy is turned on in response to the electric field, and in accordance with this, the p-type dye is aligned in a vertical direction. For this reason, the polarization components Lx are hardly absorbed, and the liquid-crystal display device shows colorlessness. The other polarization components Ly contained in incident light are not absorbed by the dichroic dye regardless of the voltage applied state or the no-voltage applied state. Therefore, in the Heilmeier-type guest-host liquid-crystal display device, one polarizing plate is interposed beforehand so that the other polarization components Ly are removed.

In the guest-host liquid-crystal display device using a nematic liquid crystal, the dichroic dye added as a guest is oriented in the same manner as the nematic liquid crystal. The polarization component parallel to the orientation direction of the liquid crystal is absorbed, but the polarization component perpendicular thereto is not absorbed. Therefore, in order to obtain sufficient contrast, one polarizing plate is disposed at the incidence side of the liquid-crystal display device so that the polarization direction of the incident light coincides with the orientation direction of the liquid crystal. However, if this is done, 50% (in practice, approximately 40%) of the incident light is lost in principle by the polarizing plate and therefore, the display is darkened as in the TN mode. As a technique for reducing this problem, merely removing the polarizing plate causes the on/off ratio of the absorbance to decrease considerably, which is not appropriate, and various improvement measures have been proposed. For example, while the polarizing plate on the incidence side is removed, a structure in which a quarter-wave phase shifter and a reflection plate are mounted at the emergence side has been proposed. In this method, the polarization directions of two polarization components perpendicular to each other are rotated by 90° in the forward and backward paths by means of the quarter-wave plate, and the polarization components are interchanged. Therefore, in the off state (absorbing state), each polarization component is absorbed along either the incidence light path or the reflection light path.

However, in this structure, since a quarter-wave plate and a reflection plate are provided externally, the liquid-crystal display device itself must be a transmissive type. In particular, in order to make possible a high resolution and moving-image display, when an active-matrix-type structure is used, thin-film transistors for driving pixel electrodes are integrated on a substrate; therefore, in the transmissive type, pixel aperture ratio is low, and a substantial portion of the incident light is shut off. Therefore, even if the polarizing plate is removed, the screen of the display apparatus cannot be made remarkably bright.

When the active-matrix-type liquid-crystal display device produces a color display, any one of the three primary colors of red, green and blue is assigned cyclically to each pixel. In order to assign these three primary colors, color filters or the like are used. The color filters selectively permit wavelengths corresponding to the three primary colors assigned to each pixel to be passed through. However, in the case of a color display, if a technique for highlighting a black display by using a quarter-wave phase shifter is employed, the dependence of the phase shifter upon wavelength exerts an adverse influence upon display quality. For this reason, a coloring influence appears during black display when the voltage is off. Further, since the polarization conversion effect of the phase shifter is not uniform over the entire wavelength region, a decrease in contrast occurs.

Furthermore, when the active-matrix-type liquid-crystal display device produces a color display, it is necessary to form a microcolor filter which is plane-divided into the three primary color components of red, green and blue in correspondence with each pixel. The active-matrix-type liquid-crystal display device has a structure such that a drive substrate on which pixel electrodes and thin-film transistors for switching purposes are integrated, and a facing substrate on which counter electrodes are formed, are joined together, and a liquid-crystal layer is held in the spacing therebetween. In a conventional active-matrix-type color liquid-crystal display device, microcolor filters are formed on the facing substrate side. However, in such a structure, when the drive substrate and the facing substrate are bonded together, it is necessary to provide a certain degree of margin in the accuracy of overlapping them, and the pixel aperture ratio is sacrificed by a corresponding amount. In a reflective full-color liquid-crystal display device not using backlight, in order to obtain a bright screen, it is necessary to enlarge the aperture ratio of the pixels as much as possible. However, in a conventional structure in which microcolor filters are provided on the facing substrate, the aperture ratio is limited due to the overlapping accuracy for them.

SUMMARY OF THE INVENTION

To solve the above-described problems, according to a first aspect of the present invention, there is provided a reflective guest-host liquid-crystal display device, comprising: a transparent substrate which is positioned on the incidence side and which includes a counter electrode; a reflection substrate which is positioned on the reflection side and which includes a plurality of pixel electrodes, switching elements for driving each pixel electrode, and a color filter layer patterned in a plane-divided manner in alignment with individual pixel electrodes; a guest-host liquid-crystal layer having added thereto a dichroic dye, which layer is held between the transparent substrate and the reflection substrate; and a phase shifter, positioned between the reflection substrate and the liquid-crystal layer, for causing a phase shift of a quarter wavelength with respect to incident light.

Preferably, the phase shifter is plane-divided in correspondence with individual pixel electrodes, and the thickness of the phase shifter is adjusted for each pixel electrode so as to provide a phase shift of a quarter wavelength with respect to the incident light assigned to corresponding pixel electrodes.

There is laminated on the reflection substrate from the bottom in the following order: a light reflection layer, a color filter layer, a phase shifter, and pixel electrodes, the total thickness of the color filter layer and the phase shifter, each of which is plane-divided, is maintained constant over all the pixels, and the thickness of the phase shifter is adjusted for each pixel electrode by varying the ratio of the thickness of the color filter layer to that of the phase shifter for each pixel electrode.

According to a second aspect of the present invention, there is provided a method of manufacturing a reflective guest-host liquid-crystal display device, the method comprising: a step for forming switching elements and a light reflection layer on a first substrate; a step for forming a plane-divided color filter layer on the light reflection layer in such a manner as to be aligned with the pixel electrodes; a step for forming a plane-divided phase shifter on the color filter layer; a step for forming pixel electrodes on the phase shifter layer in such a manner as to be aligned with each of the color filter layers and connecting the pixel electrodes to the switching elements corresponding to the pixel electrodes; a step for joining a second substrate having a counter electrode formed thereon to the first substrate with a predetermined spacing therebetween; and a step for introducing a guest-host liquid-crystal layer into the spacing.

Preferably, in the color filter layer forming step, a color filter layer is formed with its thickness varied for each pixel electrode.

In the phase shifter forming step, a phase shifter layer is formed on the color filter layer so that the surface is planarized over all the pixel electrodes.

According to a third aspect of the present invention, there is provided a reflective guest-host liquid-crystal display device, comprising: a first substrate, formed with a transparent electrode on its inner surface, for admitting incident light; a second substrate, formed with a reflection electrode on its inner surface, disposed facing the first substrate, the reflection electrode facing the transparent electrode to define a plurality of pixels; a color filter for assigning incident light of a different wavelength to each pixel; and an electro-optic element, held between the first and the second substrate, for performing light modulation in response to a voltage applied between the transparent electrode and the reflection electrode, the electro-optic element having a laminated structure including a guest-host liquid-crystal layer which contains a dichroic dye and which is uniformly oriented along the transparent electrode, and a phase shifter which has a predetermined optical axis and which is formed along the reflection electrode, and the phase shifter being divided for each pixel and the thickness thereof being adjusted according to a corresponding wavelength.

Preferably, the color filter is a dye-containing phase shifter which is divided for each pixel so as to selectively permit incident light of a corresponding wavelength component to pass through.

According to a fourth aspect of the present invention, there is provided a method of manufacturing a reflective guest-host liquid-crystal display device comprising a transparent electrode substrate, a reflection electrode substrate joined to the transparent electrode substrate with a predetermined spacing therebetween, a guest-host liquid-crystal layer held on the transparent electrode substrate side of the spacing, and a phase shifter which is held on the reflection electrode substrate side of the spacing and which is divided for each pixel of the three primary colors, the method comprising: a step for coating a phase shifter to a thickness corresponding to the wavelength of a first color on the surface of a reflection electrode substrate and then patterning so as to leave the phase shifter on only the pixels assigned with the first color; a step for coating a phase shifter to a thickness corresponding to the wavelength of a second color on the surface of the reflection electrode substrate and then patterning so as to leave the phase shifter on only the pixels assigned with the second color; and a step for coating a phase shifter to a thickness corresponding to the wavelength of a third color on the surface of the reflection electrode substrate and then patterning so as to leave the phase shifter on only the pixels assigned with the third color.

The above and further objects, aspects and novel features of the invention will become more apparent from the following detailed description when read in connection with the accompanying drawings.

DESCRIPTION OF THE PREFERRED EMBODIMENTS

Figure 1A:
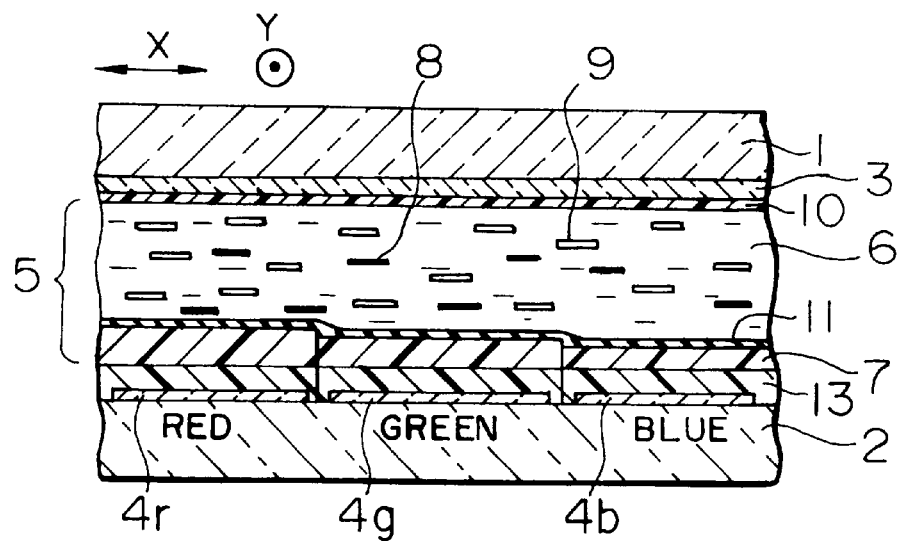
FIG. 1A is a sectional view illustrating a first embodiment of a reflective guest-host liquid-crystal display device according to the present invention.
Figure 1B:
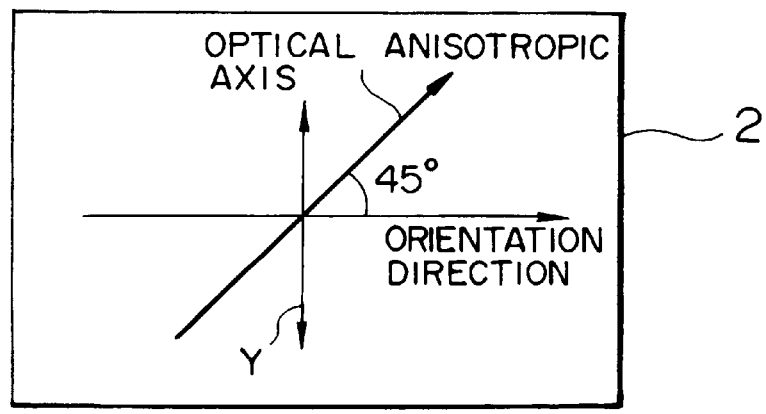
FIG. 1B is a plan view thereof.

FIGS. 1A and 1B show a first embodiment of a reflective guest-host liquid-crystal display device according to the present invention. As shown in FIG. 1A, this apparatus is assembled by using an upper substrate (transparent electrode substrate) 1 and a lower substrate (reflection electrode substrate) 2. The upper substrate 1, made of glass or the like, is formed with a transparent electrode 3, and admits incident light. This transparent electrode 3 is patterned in a stripe form, for example, along the row direction. The lower substrate 2 is formed with reflection electrodes 4r, 4g and 4b. These reflection electrodes are patterned in a stripe form along the column direction. Therefore, the transparent electrode 3 and the reflection electrodes 4r, 4g and 4b intersect in a matrix form and define pixels, and thus a simple matrix-type liquid-crystal display device is obtained. In this display device, to make a color display, any one of the three primary colors of red, green and blue is cyclically assigned to each pixel. To be specific, a color filter 13 is formed on the reflection electrodes 4r, 4g and 4b, and incident light of a different wavelength corresponding to red, green and blue is assigned to each pixel. The lower substrate 2 is disposed facing the upper substrate 1 with a predetermined spacing therebetween. An electro-optic element 5 is held in this spacing and performs light modulation of incident light in response to a voltage applied between the transparent electrode 3 and the reflection electrodes 4r, 4g and 4b (hereinafter referred to as a reflection electrode 4 when there is no particular need to distinguish among the three primary colors). The electro-optic element 5 has a laminated structure including a guest-host liquid-crystal display device 6 and a phase shifter 7. The display device 6 contains a dichroic dye 8 of, for example, black, and is uniformly oriented along the transparent electrode 3. The phase shifter 7 has a predetermined optical anisotropic axis and is coated along and on the color filter 13. The surface of the phase shifter 7 is coated with an orientation film 11. Similarly, the transparent electrode 3 formed on the surface of the upper substrate 1 is also coated with an orientation film 10.

The display device 6 changes between an absorbing state and a transmissive state in response to an applied voltage. FIG. 1A shows an absorbing state, in which first vibration components X contained in the incident light are substantially absorbed, and second vibration components Y perpendicular thereto are substantially passed through. In contrast, in the transmissive state, both the vibration components X and Y are substantially passed through. As shown in FIG. 1A, in the absorbing state, nematic liquid-crystal molecules 9 are horizontally oriented, and in accordance with this, a dichroic dye 8 is also horizontally oriented. In this embodiment, an absorbing state is realized with no application of a voltage, and the state changes to a transmissive state with the application of a voltage. For this reason, the nematic liquid-crystal molecules 9 has positive dielectric anisotropy and is controlled to horizontal orientation (homogeneous orientation) beforehand by a pair of upper and lower orientation films 10 and 11. By contrast, the absorbing state shown in FIG. 1A can also be realized with the application of a voltage. In this case, for the nematic liquid-crystal molecules 9, nematic liquid-crystal molecules having negative dielectric anisotropy are used. In such a structure, the phase shifter 7 is present in the forward and backward paths of the second vibration components Y reflected by the reflection electrode 4, causes the second vibration components Y to be converted into the first vibration components X and to reenter the display device 6 in the absorbing state.

The phase shifter 7 functions as a quarter-wave plate. As shown in FIG. 1B, the optical anisotropic axis thereof intersects at an angle of 45° with respect to the orientation direction of the liquid-crystal layer in the absorbing state. The vibration direction of the second vibration components Y (linearly polarized components) which have been transmitted through the absorbing state is perpendicular to the orientation direction. Also, these second vibration components Y intersect at an angle of 45° with respect to the optical anisotropic axis. The second vibration components Y (linearly polarized components), after passing through the quarter-wave plate, are converted into circularly polarized light. When this circularly polarized light reenters the quarter-wave plate after being reflected by the reflection electrode, the light is converted into linearly polarized light (the first vibration components X) perpendicular to the second vibration components Y. The first vibration components X converted in this way are absorbed by the display device 6 in the absorbing state.

As stated above, in the display device, to make a color display the transparent electrode 3 in a row arrangement and the reflection electrode 4 in a column arrangement face each other to define a plurality of pixels, and the color filter 13 for assigning incident light (red, green and blue) of a different wavelength to each pixel is formed. As a feature of the present invention, the phase shifter 7 is divided for each pixel, and its thickness is adjusted according to a corresponding wavelength. As shown in FIG. 1A, the phase shifter 7 is divided in correspondence with the pixels, and its thickness is made different according to the color of the pixel below. The thickness d is adjusted so that the retardation $\Delta n \cdot d$ becomes $\lambda/4$ in accordance with the assigned reflected light wavelength. For example, in a case in which an optical material having refractive index anisotropy $\Delta n$ of 0.2 is used in the phase shifter 7, an appropriate thickness of the portion corresponding to a red pixel becomes d=875 nm when $\lambda$=700 nm is set. Similarly, an appropriate thickness of the portion corresponding to a green pixel becomes d=685 nm when $\lambda$=546 nm is set. Further, an appropriate thickness of the portion corresponding to a blue pixel becomes d=545 nm when $\lambda$=436 nm is set. As described above, in the present invention, by controlling the thickness of the phase shifter 7 for each pixel, it is possible to obtain satisfactory contrast over the entire wavelength region.

Figure 2:
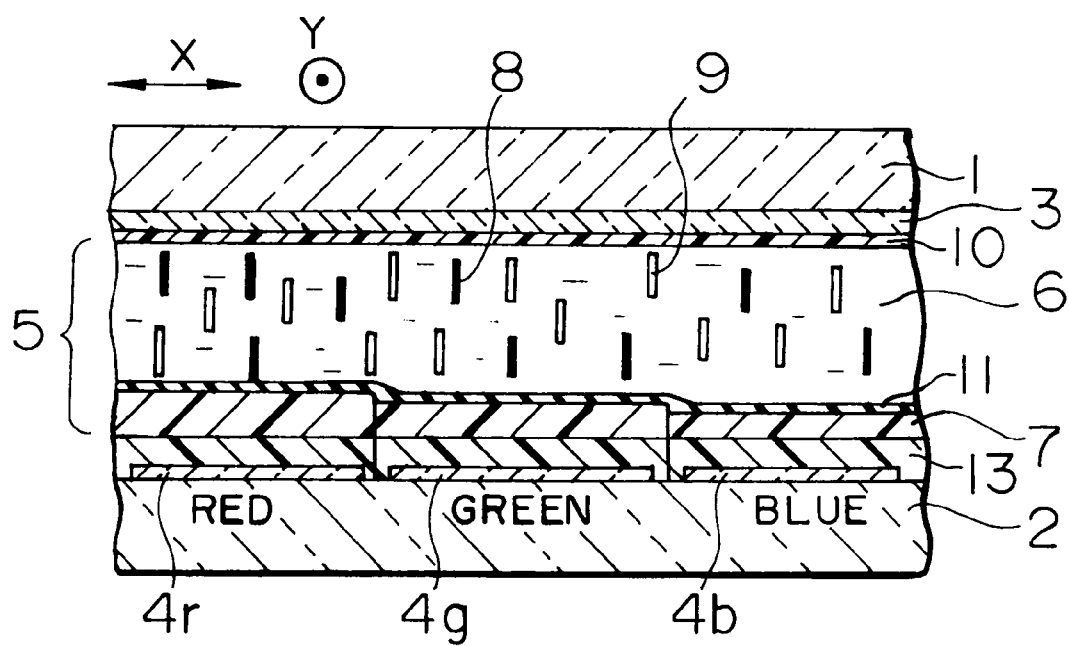
FIG. 2 is a sectional view illustrating the operation of the reflective guest-host liquid-crystal display device shown in FIG. 1.

FIG. 2 shows a transmissive state of the display device 6, in which the nematic liquid-crystal molecules 9 are vertically oriented. In accordance with this, the dichroic dye 8 is also vertically oriented. Therefore, both the first vibration components X and the second vibration components Y are nearly entirely passed through. Regarding the reflected light, the first vibration components and the second vibration components interchange each other, and the reflected light does not receive light modulation at all. The nematic liquid-crystal molecules 9 having positive dielectric anisotropy become on in response to an applied voltage and change to vertical orientation. As described above, it is also possible to realize vertical orientation of the nematic liquid-crystal molecules 9 with no application of a voltage. That is, by properly selecting a material or the like for the orientation films 10 and 11, it is possible to cause the nematic liquid-crystal molecules 9 to be vertically oriented (homeotropically oriented). In this case, nematic liquid-crystal molecules 9 having negative dielectric anisotropy are used, and the molecules are changed to horizontal orientation in response to the application of a voltage. At this time, to make the horizontal orientation direction constant, the nematic liquid-crystal molecules 9 are provided with a pretilt beforehand in the vertically oriented state.

Referring again to FIGS. 1A and 1B, and FIG. 2, a specific structure of the first embodiment will be described in detail. In this liquid-crystal display device, the display device 6 is formed of the nematic liquid-crystal molecules 9, to which device the black dichroic dye 8 is added. The display device 6 having the dichroic dye 8 mixed thereto is horizontally or vertically oriented. The reflection electrode 4 is formed of a metallic film having high reflectance, such as aluminum or silver; therefore, this display device is formed to a reflective display. A color filter 13 is formed on the reflection electrode 4 so that incident light of a different wavelength is assigned to each pixel. This color filter 13 is formed by, for example, a printing process. Formed on the color filter 13 is a transparent phase shifter 7 capable of providing a phase shift of $\lambda/4$ to the wavelength of the visible region (400 to 700 nm). In order to correctly provide a phase shift of $\lambda/4$ with respect to the wavelength for each of the three primary colors of red, green and blue, the phase shifter 7 is divided for each pixel, and its thickness is controlled according to a wavelength. When the display device 6 is horizontally oriented, the optical anisotropic axis of the phase shifter 7 is set so as to form an angle of 45° with respect to the orientation direction. When the display device 6 is vertically oriented beforehand, the optical anisotropic axis is set so as to form an angle of 45° with respect to the cosine direction of the nematic liquid-crystal molecules 9 having a pretilt angle. The phase shifter 7 is formed from a polymer containing liquid crystal molecules which are uniaxially oriented along the optical anisotropic axis. The phase shifter 7 having uniaxial anisotropy can be obtained by, for example, using a polymer liquid-crystal material (aromatic polyester, siloxane resin or the like which is a crystalline polymer), by orienting this material on the substrate at a temperature of the nematic phase or smectic A phase, and then by returning it to room temperature and fixing it. If a $\lambda/4$ layer is formed using a polymer liquid-crystal material having high refractive index anisotropy ($\Delta n$), the coating thickness thereof can be made sufficiently thin. Therefore, since the $\lambda/4$ layer can be coated on the color filter 13, the process for manufacturing the display device can be simplified. An orientation film 11 serving also as a passivation layer is interposed between the phase shifter 7 and the display device 6. As the orientation film 11, a photosensitive material can be used so that the orientation film 11 can be patterned by exposure development. As a photosensitive material, a material may be used having, for example, a very small amount of ammon bichromate for causing photocrosslinking reaction added to an aqueous solution of polyvinyl alcohol (PVA), and can be coated onto the substrate by spin coating or the like. PVA has excellent orientation characteristic with respect to the display device 6 and is suitable as the orientation film 11 serving also as passivation.

Referring further to FIGS. 1A and 1B, and FIG. 2, the operation of the reflective guest-host liquid-crystal display device of the present invention will be described in detail. A case in which light enters from outside is considered in the horizontally oriented state shown in FIG. 1A. First, incident light can be considered by separating it into first vibration components X and second vibration components Y, which are polarization components perpendicular to each other. Since the first vibration components X are oriented in the same direction as the orientation direction of the liquid-crystal layer 6, the first vibration components X are absorbed by the black dichroic dye 8 which is oriented in the same direction. However, since the second vibration components Y are perpendicular to the orientation direction of the dye molecules, these components are not absorbed at all. Therefore, the second vibration components Y pass through the liquid-crystal layer 6 and further enter the phase shifter 7 which functions as a quarter-wave plate. Further, the second vibration components Y are reflected by the reflection electrode 4 after passing through the color filter 13 and again pass through the phase shifter 7. It follows that the second vibration components Y have passed twice through the phase shifter 7, and the polarization direction thereof is rotated 90°. Thereupon, since the direction coincides with the orientation direction of the liquid crystal 6, light is absorbed. Since, in this way, all of the vibration components contained in the incident light are absorbed in either the forward or backward path, contrast comparable to that of a transmissive reflective guest-host liquid-crystal display device with a polarizing plate can be obtained without a polarizing plate. On the other hand, in the transmissive state, selection of a wavelength is made for each pixel in correspondence with the three primary colors by means of the color filter 13, and a desired color display can be made.

Referring to FIGS. 3A, 3B, 3C, 3D and 3E, a method of coating the phase shifter 7 whose thickness is varied for each pixel will be described in detail. Initially, in the step in FIG. 3A, after a substrate 2 made of glass or the like is cleaned, a metallic film is formed on the surface thereof by sputtering or vacuum evaporation. This metallic film is patterned to a predetermined shape and processed to a reflection electrode 4. Here, in order to distinguish the reflection electrodes from one another, to which red, green and blue are individually assigned, reference numerals 4r, 4g and 4b are used. In this embodiment, an example will be described in which a phase shifter 7 having a predetermined thickness is selectively formed on the reflection electrode 4g to which, for example, the green color is assigned. After the reflection electrode 4 is formed, a color filter 13 is formed thereon. The color filter 13 is colored red, green and blue in accordance with the reflection electrodes 4r, 4g and 4b, and can be formed by a well-known printing process. The base of this color filter 13 is rubbed along a predetermined direction. Further, a polymer liquid-crystal material is coated onto the color filter 13. This polymer liquid-crystal material is a polymer liquid crystal of a side-chain-type in which, for example, mesogen of benzoic ester is formed into a pendant. 3 to 5 wt. % of this polymer liquid crystal is dissolved into a solution in which cyclohexane and methyl ethyl ketone are mixed at a ratio of 8:2. This solution is, for example, spin-coated to coat a polymer liquid crystal on a glass substrate 2. In this case, by adjusting the rotational speed of the spin coating, the thickness of the polymer liquid-crystal material is optimized. Thereafter, the substrate is heated to heat the polymer liquid crystal once to an optically isotropic state. Then, the heating temperature is decreased gradually to room temperature through a nematic phase. In the nematic phase, the polymer liquid crystal is oriented along the base rubbing direction of the color filter 13, and desired uniaxial orientation characteristics can be obtained. This uniaxial orientation state is fixed by returning the substrate 2 to room temperature. By such an annealing process, the liquid-crystal molecules contained in the polymer liquid-crystal material are uniaxially oriented, and a desired phase shifter 7 can be obtained.

Figure 3A:
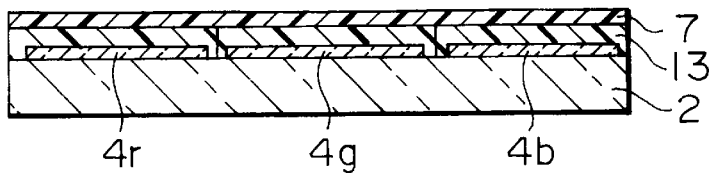
FIGS. 3A, 3B, 3C, 3D and 3E are process charts illustrating a method of forming a phase shifter incorporated in the reflective guest-host liquid-crystal display device shown in FIG. 1.
Figure 3B:
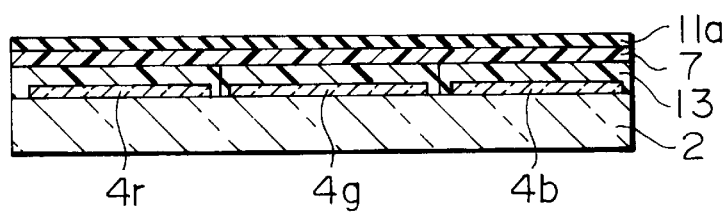
Figure 3C:
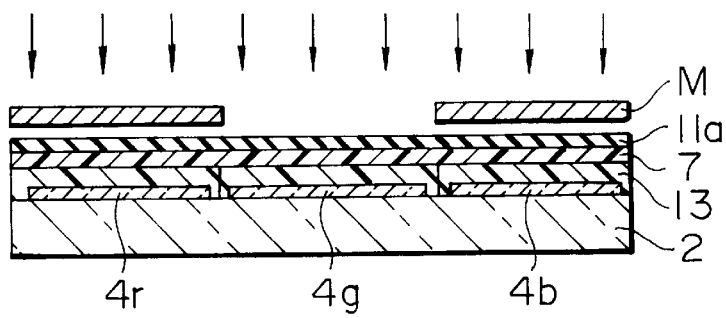
Figure 3D:
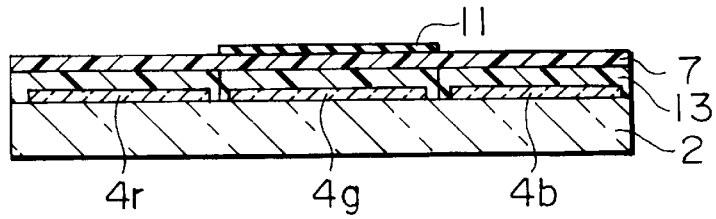
Figure 3E:
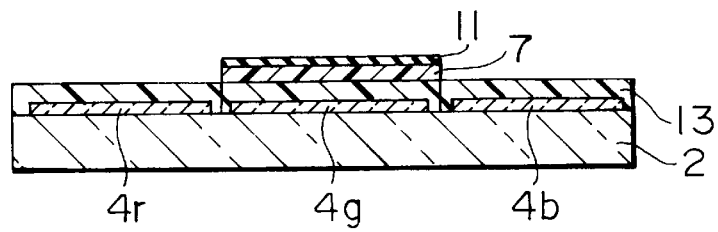

The process proceeds to the step in FIG. 3B where a photosensitive material 11a is coated on the phase shifter 7. For example, an aqueous solution (0.1 to 5 wt %) of PVA is spin-coated. At this time, for example, a very small amount of ammon bichromate is added to the aqueous solution to cause a photocrosslinking reaction of PVA. Next, the process proceeds to the step in FIG. 3C where an exposure process is performed with a silver lamp or xenon lamp by using a predetermined mask M. Further, the process proceeds to the step in FIG. 3D where when a washing-with-water process is performed, that portion of the photosensitive material 11a which was not exposed is dissolved into water, and an orientation film 11 formed from patterned polymer of PVA is formed. Finally, in the step in FIG. 3E, when the substrate 2 is immersed in n-butanone with this orientation film 11 as a mask, that portion of the phase shifter 7 which was not covered by the orientation film 11 is dissolved and patterned in alignment with the reflection electrode 4g. In this way, a phase shifter 7 having a thickness corresponding to a wavelength can be selectively formed for each pixel. Thereafter, by rubbing the orientation film 11 along a predetermined direction, the horizontal orientation of the guest-host liquid-crystal layer in contact thereon is realized, and the orientation film 11 functions as a blocking layer (passivation layer) for both the polymer liquid crystal and the guest-host liquid-crystal layer, which layer is interposed between them.

Figure 4:
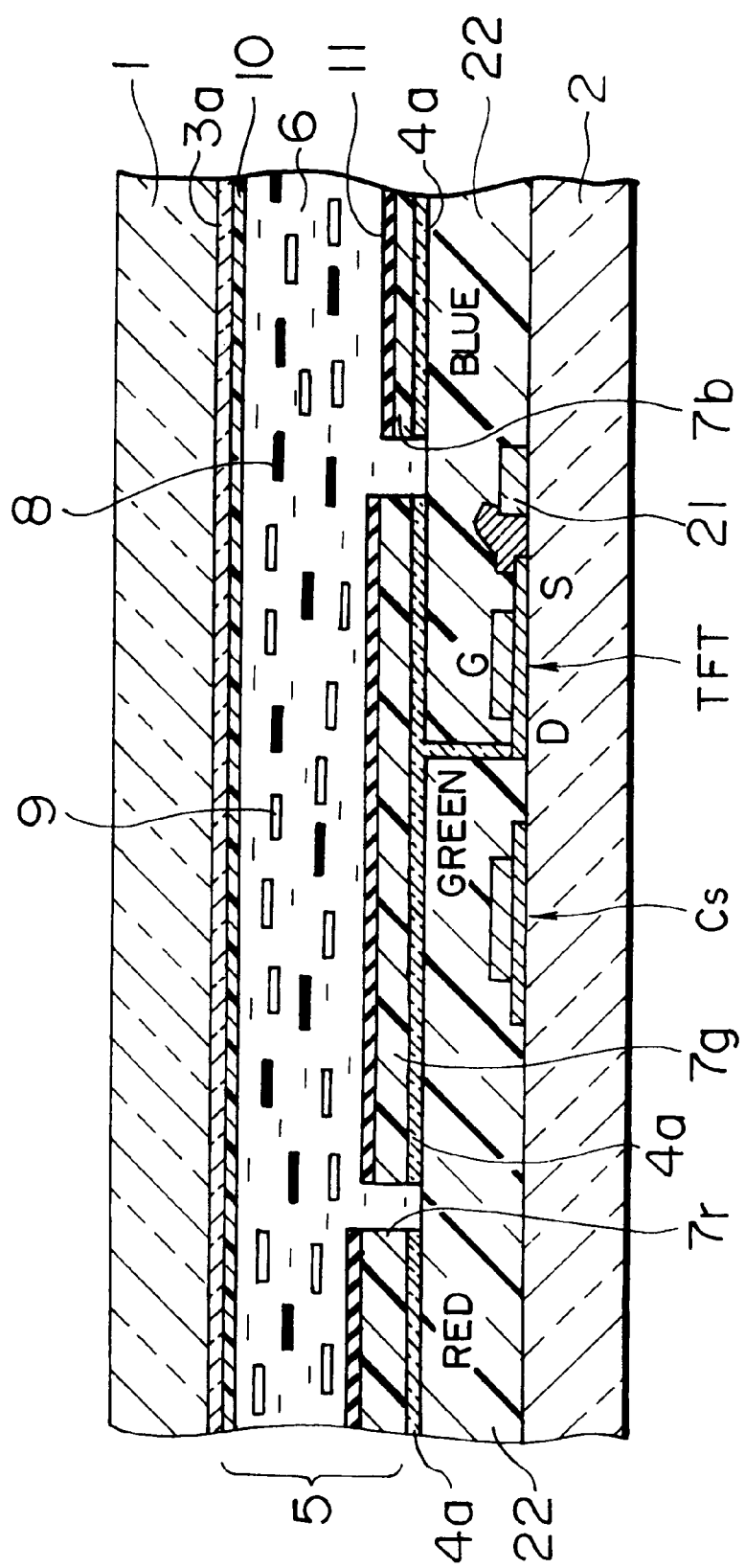
FIG. 4 is a schematic partial sectional view illustrating a second embodiment of a reflective guest-host liquid-crystal display device according to the present invention.
Figure 5A:
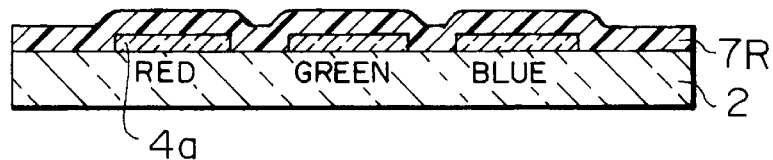
FIGS. 5A, 5B, 5C, 5D and 5E are process charts illustrating a method of forming a phase shifter incorporated in the reflective guest-host liquid-crystal display device shown in FIG. 4.
Figure 5B:
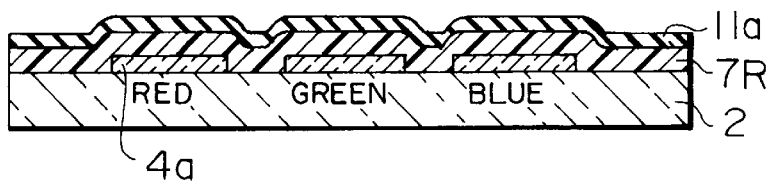
Figure 5C:
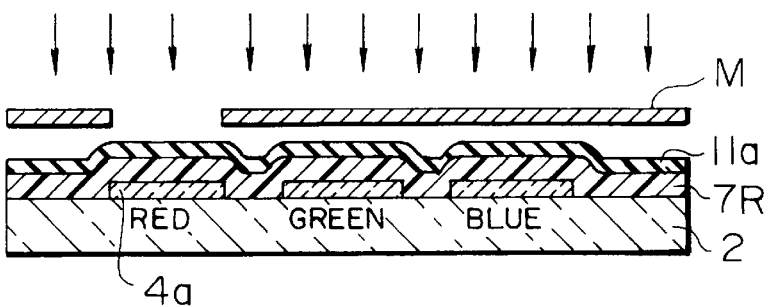
Figure 5D:
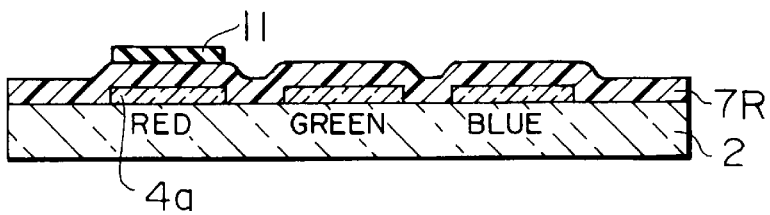
Figure 5E:
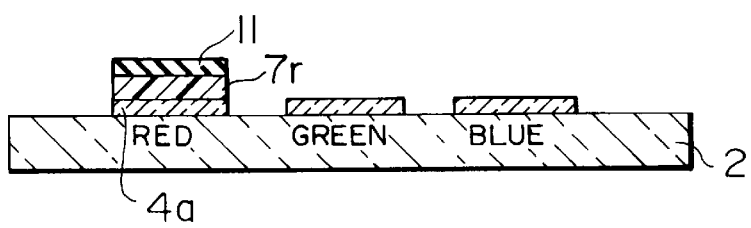
Figure 6A:
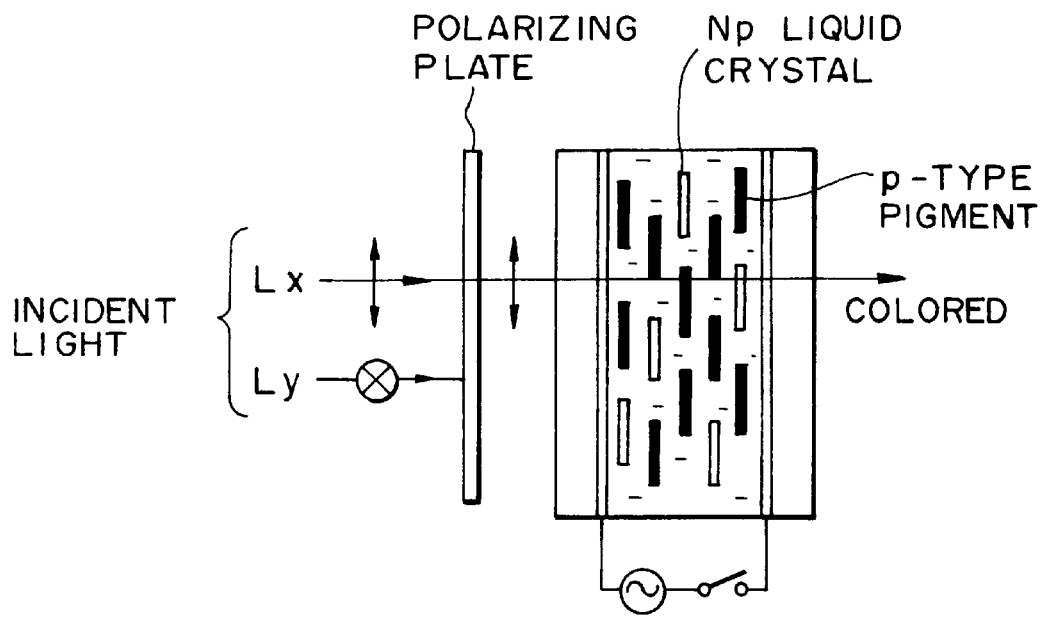
FIGS. 6A and 6B are sectional views illustrating an example of a conventional reflective guest-host liquid-crystal display device.
Figure 6B:
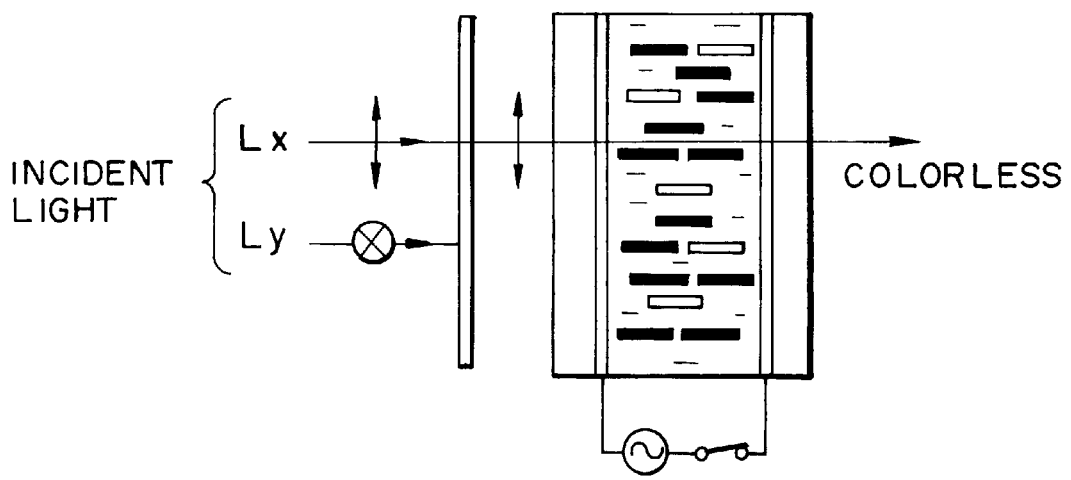

FIG. 4 is a schematic, partial sectional view illustrating a second embodiment of a reflective guest-host liquid-crystal display device according to the present invention. This display device has basically the same structure as that of the first embodiment shown in FIG. 1, and corresponding components are given corresponding reference numerals so as to facilitate understanding. As shown in FIG. 4, an upper substrate 1 has a counter electrode 3a formed from a transparent electrode which is formed over the entire surface thereof, and a lower substrate 2 has pixel electrodes 4a formed of reflection electrodes which are finely divided in a matrix form. Whereas the earlier embodiment is of a simple matrix type, this embodiment is of an active matrix type. Individual pixel electrodes 4a are assigned with any one of the three primary colors of red, green and blue. In addition to these pixel electrodes 4a patterned in a matrix form, thin-film transistors TFTs are also integrated on the inner surface of the lower substrate 2 in correspondence with the pixel electrodes. These TFTs serve as switching elements for driving the pixel electrodes 4a individually. That is, by selectively controlling the on/off of the TFT, a signal voltage is written into a corresponding pixel electrode 4a. The drain region D of a TFT is connected to the pixel electrode 4a, and the source region S is connected to a signal line 21. The gate electrode G of the TFT is connected to a gate line. Further, a holding capacitor Cs is also formed in correspondence with each pixel electrode 4a. The pixel electrode 4a is electrically separated from the TFT, the holding capacitor Cs, and the signal line 21 by a planarized film 22. On the other hand, a counter electrode 3a is formed entirely on the inner surface of the upper substrate 1. An electro-optic element 5 is held within the spacing between the two substrates 1 and 2 disposed facing each other with a predetermined spacing therebetween. When a signal voltage is written into the pixel electrode 4a, an electrical potential occurs between the pixel electrode 4a and the counter electrode 3a, and the electro-optic element 5 varies between an absorbing state and a transmissive state. Since this optical change appears for each pixel electrode, an intended image display can be made. The TFT, the holding capacitor Cs, the signal line 21 and the like are disposed below the pixel electrode 4a. Since these structural elements are not present in the incident light path, no influence is exerted upon the pixel aperture ratio. In other words, the entire area of the pixel electrode 4a can be used as a pixel aperture as it is, and a very bright display can be made.

The guest-host liquid-crystal layer 6 and the phase shifter 7 which constitute the electro-optic element 5 are separated from each other by the orientation film 11. The orientation film 11 is made from a photosensitive material and is patterned in alignment with the pixel electrodes 4a by an exposure development process. The phase shifter 7 is similarly patterned for each pixel electrode 4a with this patterned orientation film 11 as a mask. In this embodiment, the patterned phase shifter 7 includes coloring regions 7r, 7g and 7b which are divided into red, green and blue, and constitutes a color filter in alignment with the pixel electrodes 4a in correspondence with each coloring region. That is, the color filter of this embodiment is formed of a dye introduced into the phase shifter 7 itself which is divided for each pixel and permits incident light of a corresponding wavelength component to be selectively passed through. Further, the thicknesses of the coloring regions 7r, 7g and 7b of the phase shifter 7 divided for each pixel are adjusted according to the corresponding wavelength as shown in FIG. 4.

FIGS. 5A, 5B, 5C, 5D and 5E are process charts illustrating a method of manufacturing a color filter shown in FIG. 4. Initially, in the step in FIG. 5A, a pixel electrode 4a is formed by patterning on a substrate 2. After the surface thereof is oriented, a phase shifter 7R is coated thereon. In this example, since color filters of the three primary colors of red, green and blue are formed, for the phase shifter 7R, a layer which is colored red beforehand is used. For example, a substituent group for absorbing the red wavelength component is introduced into the side chain of a polymer material which forms the phase shifter. Alternatively, a conventional red dye which does not show dichroic properties may be mixed into a liquid-crystal polymer material. The phase shifter 7R which is colored red beforehand in this way is coated to the most appropriate thickness on the substrate 2. This specific coating method is the same as that shown in FIGS. 3A, 3B, 3C, 3D and 3E. Next, in the step in FIG. 5B, a photosensitive material 11a is coated onto the red phase shifter 7R. In the step in FIG. 5C, the photosensitive material 11a is exposed via the mask M. In the step in FIG. 5D, the substrate 2 is washed with water to remove the nonsensitized portion of the photosensitive material 11a and then developed. As a result, an orientation film 11 patterned in alignment with a specific pixel electrode 4a is formed. In the step in FIG. 5E, the red phase shifter 7R is etched using this orientation film 11 as a mask and processed to a phase shifter 7r in alignment with the pixel electrode 4a. Hereinafter, in a similar manner, a magenta region and a blue region can be respectively formed to an intended thickness on the corresponding pixel electrodes 4a.

Figure 7:
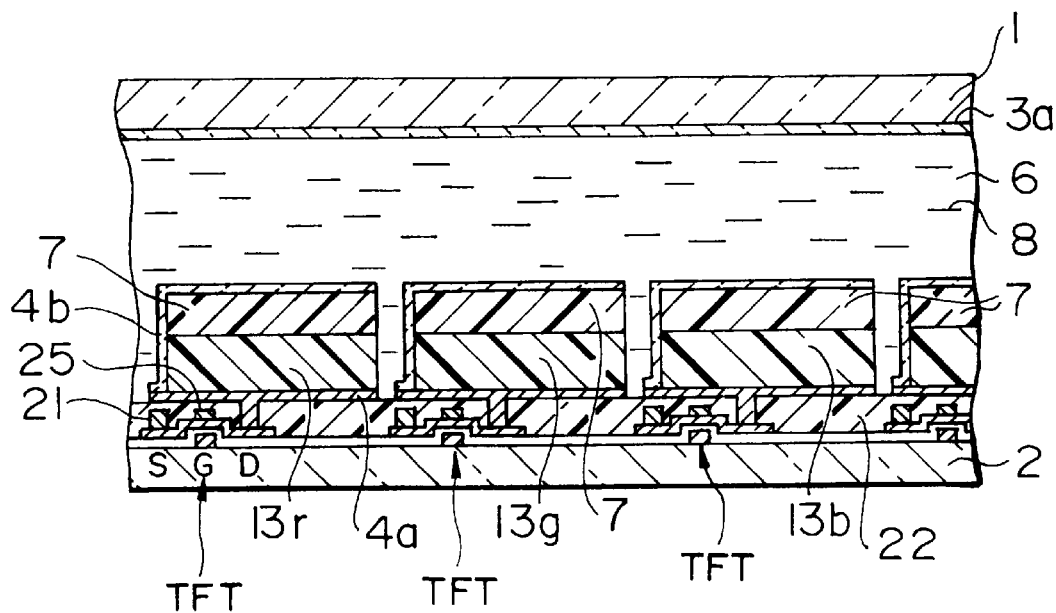
FIG. 7 is a schematic partial sectional view illustrating a third embodiment of a reflective guest-host liquid-crystal display device according to the present invention.

Next, referring to FIG. 7, a third embodiment of a reflective guest-host liquid-crystal display device according to the present invention will be described in detail. Basically, this display device is of an active matrix type in the same way as in the second embodiment shown in FIG. 4, and corresponding components are given corresponding reference numerals so as to facilitate understanding. In FIG. 7, reference numeral 2 denotes a substrate on the reflection side where TFTs and the like are formed. Reference numeral 1 denotes a glass substrate on the incidence side on which a counter electrode 3a is formed. Reference numeral 4b denotes an upper-layer pixel electrode formed from a transparent electroconductive film of ITO or the like. Meanwhile, reference numeral 4a denotes a lower-layer pixel electrode formed from a reflective metallic film of aluminum or the like. The upper-layer pixel electrode 4b and the lower-layer pixel electrode 4a which correspond to each other are held at the same electrical potential. A color filter 13 and a phase shifter 7 are held between the two pixel electrodes 4b and 4a. A thin-film transistor TFT comprises a source region S, a drain region D, and a gate electrode G. The drain region D is electrically connected to the above-described upper-layer pixel electrode 4b and lower-layer pixel electrode 4a. Reference numeral 25 denotes an etching stopper in alignment with the gate electrode G. Reference numeral 6 denotes a guest-host liquid-crystal layer containing a black dichroic dye 8. As described above, this liquid-crystal display device comprises a transparent substrate 1 which is positioned on the incidence side and which includes the counter electrode 3a; a reflection substrate 2 which is positioned on the reflection side and which includes the pixel electrodes 4b and 4a, and thin-film transistor TFTs, which are provided in an integrated manner, for driving these pixel electrodes; a guest-host liquid-crystal layer 6 held between the transparent substrate 1 and the reflection substrate 2 which are joined together with a predetermined spacing therebetween and, to which layer a dichroic dye 8 is added; and a phase shifter 7 interposed between the reflection substrate 2 and the liquid-crystal layer 6, and which causes a quarter-wave phase shift with respect to incident light. Color filter layers 13r, 13g and 13b which are patterned in a plane-divided manner in alignment with the individual pixel electrodes 4b and 4a are formed on the reflection substrate 2 so that a color display is made possible by assigning incident light of a different wavelength to each of the pixel electrodes 4b and 4a. In FIG. 7, a color filter layer 13r is colored red, a color filter layer 13g is colored green, and a color filter layer 13b is colored blue.

As is clear from FIG. 7, a feature of this embodiment is that the color filter layers 13r, 13g and 13b are provided in alignment with each of the pixel electrodes 4b and 4a on the substrate 2 on the reflection side. As a result, it becomes possible to cause the pixel electrodes and the color filter layers to overlap each other with high accuracy for each color, thus the aperture ratio of the pixels can be markedly improved. In contrast, in a conventional structure, color filters are formed on the substrate 1 on the incidence side. In this case, when the two substrates 1 and 2 are joined together and assembled into a panel, a design with a margin must be made by taking into consideration the overlapping accuracy between the glass substrate on the facing side on which color filters are formed and the substrate on the drive side on which TFTs and the like are integrated. For this reason, the pixel aperture of the panel is forced to be smaller than the pixel electrodes.

Next, the operating principles of a third embodiment shown in FIG. 7 will be described briefly. When the electrical potential of the gate electrode G is at a low level, a signal voltage is not applied to the reflection pixel electrode 4a and the transparent pixel electrode 4b which are connected to the drain region D; therefore, no change occurs in the homogeneously oriented liquid-crystal layer 6. Regarding light which enters from the glass substrate 1 on the facing side, one linearly polarized component is absorbed by the guest-host liquid-crystal layer 6, and the other linearly polarized component perpendicular thereto passes therethrough. As a result of passing through the phase shifter 7, this other linearly polarized component is transformed into circularly polarized light. Further, the light which is reflected by the reflection pixel electrode 4a and passes through the phase shifter 7 in the backward path transforms into linearly polarized light. In this case, since the phase thereof is rotated 90°, the linearly polarized light is absorbed by the guest-host liquid-crystal layer 6. Through the above process, a black display can be obtained. In comparison with this, when the electrical potential of the gate electrode G is at a high level, a signal voltage is applied to the reflection pixel electrode 4a and the transparent pixel electrode 4b; therefore, an electrical-potential difference occurs in the space adjoining the counter electrode 3a, causing the long-axis direction of the liquid-crystal molecules contained in the liquid-crystal layer 6 to be oriented parallel to the electric field. In this case, since the light which enters from the glass substrate 1 on the facing side does not transform into linearly polarized light by the liquid-crystal layer 6, all of the light is reflected by the reflection pixel electrode 4a and returns to the glass substrate 1 on the facing side. Therefore, a white display can be obtained. Although the foregoing description is concerned with a case in which a liquid crystal with positive dielectric anisotropy is used, it may also be possible to use a liquid crystal with negative dielectric anisotropy and to make the initial orientation homeotropic.

Referring again to FIG. 7, a description will be given below of a method of manufacturing a liquid-crystal display device in accordance with the third embodiment of the present invention. As stated before, this liquid-crystal display device has a reflective active matrix structure in which TFTs which serve as switching elements, reflection pixel electrodes 4a which serve as light reflection layers, a color filter layer 13, a phase shifter 7, a transparent pixel electrode 4b, a guest-host liquid-crystal layer 6, and a counter electrode 3a are incorporated in an integrated manner. This liquid-crystal display device is manufactured by the steps described below. Initially, in a first step, TFTs and reflection pixel electrodes 4a are formed on a lower substrate 2. The process then proceeds to a second step where color filter layers 13r, 13g and 13b are formed on each reflection pixel electrode 4a by plane-dividing the color filter in such a manner as to be aligned with the transparent pixel electrode 4b beforehand. To be specific, first a photoresist having a red dye dispersed therein is coated onto the substrate 2. This photoresist is exposed and developed, and thus processed to a color filter layer 13r in alignment with the reflection pixel electrode 4a. The same exposure and development process is performed on a photoresist having a green dye dispersed therein and a photoresist having a blue dye dispersed therein so that the photoresists are processed to a green color filter layer 13g and a blue color filter layer 13b, respectively. Then, the process proceeds to a third step where a phase shifter 7 is formed on each of the color filter layers 13r, 13g and 13b similarly in a plane-divided manner. The plane division of the phase shifter 7 can be performed by photolithography and etching. The process proceeds to a fourth step where transparent pixel electrodes 4b are formed on the phase shifter 7 in such a manner as to be aligned with each of the plane-divided color filter layers 13r, 13g and 13b. This transparent pixel electrode 4b is connected to the drain region D of a corresponding TFT. As described above, in this embodiment, in addition to the reflection pixel electrode 4a, the transparent pixel electrode 4b is used, and a signal voltage can be applied in the space adjoining the counter electrode 3a in a form in direct contact with the liquid-crystal layer 6. As a result, the value of the effective signal voltage applied to the liquid-crystal layer 6 is increased. By bringing the reflection pixel electrode 4a and the transparent pixel electrode 4b into the same electrical potential, no adverse influence is exerted upon the phase shifter 7 and the color filter layer 13 which are interposed between the pixel electrodes. The process proceeds to a fifth step where the other substrate 1 on which the counter electrode 3a is formed beforehand is joined to one substrate 2 with a predetermined spacing therebetween. Finally, a sixth step is performed where the guest-host liquid-crystal layer 6 is introduced into the spacing between the two substrates 1 and 2. Through the above process, a reflective guest-host liquid-crystal display device having an active matrix structure can be completed.

Figure 8:
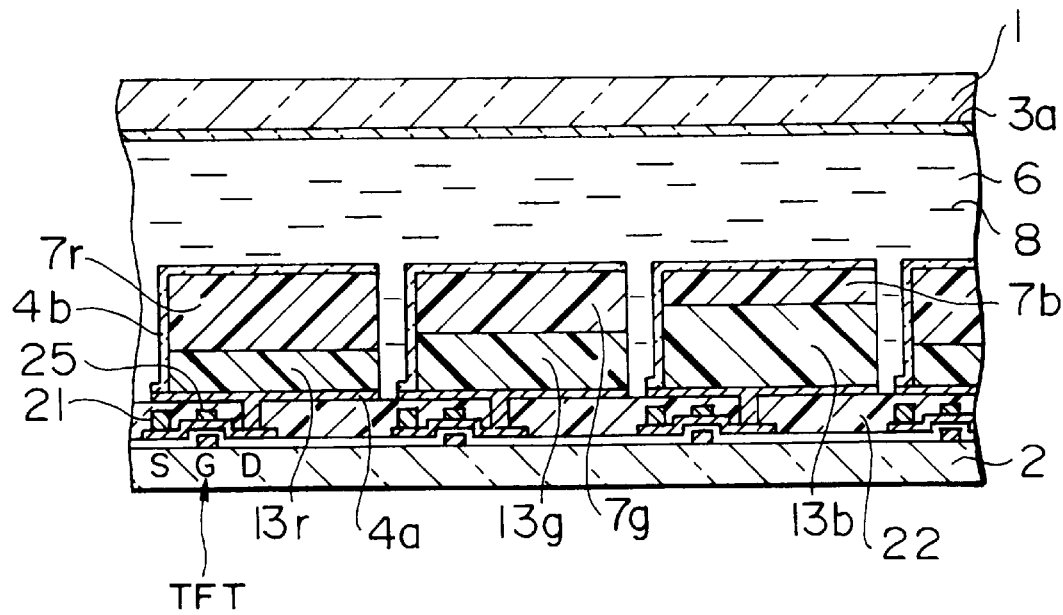
FIG. 8 is a schematic partial sectional view illustrating a fourth embodiment of a reflective guest-host liquid-crystal display device according to the present invention.

FIG. 8 is a partial sectional view illustrating a fourth embodiment of a reflective guest-host liquid-crystal display device according to the present invention. Components in FIG. 8 which correspond to those of the third embodiment shown in FIG. 7 are given corresponding reference numerals so as to facilitate understanding. In the same way as in the third embodiment, the phase shifter 7 is also plane-divided in correspondence with individual pixel electrodes 4a. As a feature, the thickness of the phase shifter 7 is adjusted for each pixel electrode so that the plane-divided phase shifter 7 precisely provides a phase shift of a quarter wavelength with respect to the incident light of each color which is assigned to a corresponding pixel electrode 4a. To be specific, there is laminated on the substrate 2 on the reflection side in the following order from the bottom: the reflection pixel electrode 4a, the color filter layer 13, the phase shifter 7 and the transparent pixel electrode 4b, and the total thickness of the color filter 13 and the phase shifter 7 which are each plane-divided is maintained constant over all of the pixel electrodes. Then, by varying the ratio of the thickness of the color filter layers 13r, 13g and 13b to that of the phase shifter 7 for each pixel electrode, the thickness of the phase shifter 7 is adjusted for each pixel electrode. That is, the coating thickness of the phase shifter 7 corresponding to each color of red, green and blue is different, and each coating thickness is adjusted according to the reflection light wavelength of a corresponding pixel so that the phase shift becomes $\lambda/4$. As this $\lambda/4$ phase shifter, for example, a liquid-crystal polymer may be used. When a liquid-crystal polymer material having, for example, refractive index anisotropy of $\Delta n=0.2$ is used, an appropriate coating thickness of the liquid-crystal polymer material corresponding to each of red, green and blue is calculated as 875 nm with respect to a red component of $\lambda=700$ nm, 685 nm with respect to a green component of $\lambda=546$ nm, and 545 nm with respect to a blue component of $\lambda=436$ nm.

Referring again to FIG. 8, a method of manufacturing a liquid-crystal display device in accordance with a fourth embodiment of the present invention will be described below. A feature of this embodiment is that color filter layers 13r, 13g and 13b are formed by varying the thickness thereof for each pixel, and thereafter, phase shifters 7r, 7g and 7b are formed on the color filter layers 13r, 13g and 13b so that the surface becomes flat over all of the pixels. That is, by properly controlling the coating thickness of the color filter layer 13 formed under the phase shifter 7 for each color, the coating thickness of the phase shifter 7 coated onto the color filter 13 is set automatically. As mentioned before, the color filter layers 13r, 13g and 13b for red, green and blue may be formed using a photosensitive photoresist having, for example, a dye dispersed therein. In this case, the color filter layers 13r, 13g and 13b are formed separately from one another. In a coating method, when, for example, a spinner is used, by adjusting the number of rotations of the spinner, it is possible to easily control the coating thickness of the color filter layers of each of red, green and blue. The phase shifter 7 made from a liquid-crystal polymer material is coated by, for example, a spinner, onto the color filter layers 13r, 13g and 13b having properly controlled thicknesses. In such a case, since the step differences of the surfaces of the color filter layers 13r, 13g and 13b are automatically made even, it is possible to mutually change the coating thickness of the phase shifters 7r, 7g and 7b corresponding to each color of red, green and blue as shown in FIG. 8. The problem of a deterioration in the white balance as a result of the change in the thickness of the phase shifter 7 for each color is feared. However, by adjusting the density of a dye dispersed into the photoresist for each color, this problem can be overcome. As described above, by controlling the thickness of the phase shifter 7 for each color, it is possible to obtain a satisfactory display contrast over the entire wavelength region of the visible region.

As has been described up to this point, according to the present invention, a reflection electrode is formed inside a guest-host liquid-crystal display device so as to make this display device to be a reflective type, and a phase shifter which functions as a quarter-wave plate is formed on this reflection electrode. The optical anisotropic axis (optical main-axis) thereof is set to be inclined 45° with respect to the orientation direction of the guest-host liquid crystal. With such a structure, a bright reflective liquid-crystal display device which does not require a polarizing plate and which has a high contrast can be realized. In particular, when a color display is produced, the phase shifter is divided for each pixel, and the thickness thereof is adjusted according to the wavelength of the corresponding three primary colors. That is, by controlling the thickness of the phase shifter for each pixel for the three primary colors, it is possible to obtain a satisfactory contrast over the entire wavelength region, and it is possible to suppress coloring in the case of a black display. Further, by providing microcolor filters on the drive substrate side on which TFTs are formed, rather than on the facing substrate side, the pixel aperture ratio can be increased, and image quality, such as contrast, can be improved.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A display device comprising:

a transparent substrate positioned on an incidence side;

a reflection substrate spaced apart from the transparent substrate which is positioned on a reflection side and which includes a plurality of pixel electrodes, switching elements for driving each pixel electrode, and a color filter layer patterned in a plane-divided manner in alignment with individual pixel electrodes such that a plurality of first, second and third color filters are associated with respective pixel electrodes;

a guest-host liquid-crystal layer which is held between said transparent substrate and said reflection substrate; and a plurality of individual phase shifter elements in one-to-one correspondence with individual ones of the plurality of first, second and third color filters.

2. A display device according to claim 1, wherein a thickness of said phase shifters is adjusted for each pixel electrode so as to provide a phase shift of a quarter wavelength with respect to the incident light corresponding to the filter associated with the respective phase shifter.

3. A display device according to claim 2, wherein there is laminated on said reflection substrate from a bottom in the following order: a light reflection layer, a color filter layer, a phase shifter, and pixel electrodes, a total thickness of said color filter layer and said phase shifter each of which is plane-divided, is maintained substantially to a constant over all the pixels, and a thickness of said phase shifter is adjusted for each pixel electrode by varying the ratio of the thickness of the color filter layer to that of the phase shifter for each pixel electrode.

4. A method of manufacturing a display device, said method comprising the steps of:

forming switching elements and a light reflection layer on a first substrate;

forming a plane-divided color filter layer on said light reflection layer in such a manner as to provide individual filters aligned with respective ones of the pixel electrodes;

forming a plane-divided phase shifter on said color filter layer such that a plurality of phase shifters are in one-to-one correspondence with respective ones of the filters;

forming pixel electrodes on said phase shifter layer in such a manner as to be aligned with each of said color filters and connecting the pixel electrodes to the switching elements corresponding to the pixel electrodes;

joining a second substrate having a counter electrode formed thereon to said first substrate with a predetermined spacing therebetween; and providing a guest-host liquid-crystal layer into said spacing.

5. A method of manufacturing a display device according to claim 4, wherein said color filter layer forming step, further comprises forming a color filter layer with a thickness which varies among the respective pixel electrodes.

6. A method of manufacturing a display device according to claim 5, wherein said phase shifter forming step further comprises forming, a phase shifter on said color filter layer so that the surface is substantially planarized over all the pixel electrodes.

7. A display device, comprising:

a first substrate, formed with a transparent electrode on an inner surface;

a second substrate spaced apart from the first substrate, the second substrate having an inner surface on which a plurality of reflection electrodes are formed disposed facing said first substrate, said reflection electrodes defining a plurality of pixels;

a plurality of color filters associated with respective ones of said pixels; and an electro-optic element, held between said first substrate and said second substrate, for performing light modulation in response to a voltage applied between said transparent electrode and said reflection electrode, said electro-optic element having a laminated structure including a guest-host liquid-crystal layer which contains a dichroic dye and which is uniformly oriented along said transparent electrode, and a plurality of phase shifters arranged in one-to-one correspondence with respective ones of the plurality of pixels wherein the phase shifters have a thickness that varies according to a corresponding wavelength of a filter associated with the phase shifter.

8. A display device comprising:

a transparent substrate positioned on an incidence side;

a reflection substrate spaced apart from the transparent substrate which is positioned on a reflection side and which includes a plurality of pixel electrodes;

a guest-host liquid-crystal layer which is held between said transparent substrate and said reflection substrate; and a plurality of phase shifters in one-to-one correspondence with corresponding ones of the plurality of pixel electrodes positioned between said reflection substrate and said liquid-crystal layer, for causing a phase shift of a quarter wavelength with respect to incident light wherein said phase shifters each comprise a dye so as to selectively permit incident light of a corresponding wavelength component to pass through.

9. A method of manufacturing a display device comprising a transparent electrode substrate, a reflection electrode substrate joined to said transparent electrode substrate with a predetermined spacing therebetween, a guest-host liquid-crystal layer held in said spacing, and a plurality of phase shifters, said method comprising:

forming a first phase shifter layer to a thickness corresponding to a wavelength of a first color over a reflection electrode layer and then patterning the first phase shifter layer so as to leave the first phase shifter layer on only the pixels associated with the first color;

forming a second phase shifter layer to a thickness corresponding to a wavelength of a second color over the reflection electrode layer and then patterning the second phase shifter layer so as to leave the second phase shifter layer on only the pixels associated with the second color; and forming a third phase shifter layer to a thickness corresponding to a wavelength of a third color over the reflection electrode layer and then patterning the third phase shifter layer so as to leave the third phase shifter layer on only the pixels associated with the third color.

* * * * *